(No Model.)

W. H. HARRISON.
CAR STARTER.

No. 271,066. Patented Jan. 23, 1883.

WITNESSES:
C. Neveux
D. J. Underwood

INVENTOR:
W. H. Harrison
BY Munn & Co
ATTORNEYS.

N. PETERS, Photo-Lithographer, Washington, D. C.

UNITED STATES PATENT OFFICE.

WILLIAM H. HARRISON, OF LOUISVILLE, KENTUCKY, ASSIGNOR TO HIMSELF AND HARDIN H. LITTELL, OF SAME PLACE.

CAR-STARTER.

SPECIFICATION forming part of Letters Patent No. 271,066, dated January 23, 1883.

Application filed June 3, 1882. (No model.)

*To all whom it may concern:*

Be it known that I, WILLIAM H. HARRISON, of Louisville, in the county of Jefferson and State of Kentucky, have invented a new and useful Improvement in Car-Starters, of which the following is a full, clear, and exact description.

The object of this invention is to afford increased facilities for starting or putting a street-car or other draft-vehicles in motion without objectionable jerk, and of preventing a retrograde movement of the car when stopped on an upgrade, also of liberating the starter when it is required to back the car or vehicle; and the invention consists in a novel construction and combination of devices for these purposes, substantially as hereinafter described, and in a special construction of parts whereby the starter may be readily applied to the axle of a car or be detached therefrom without removing the axle or wheels of the car or otherwise disturbing the connection of the running-gear with the body of the car.

Reference is to be had to the accompanying drawings, forming part of this specification, in which similar letters of reference indicate corresponding parts in all the figures.

Figure 1:
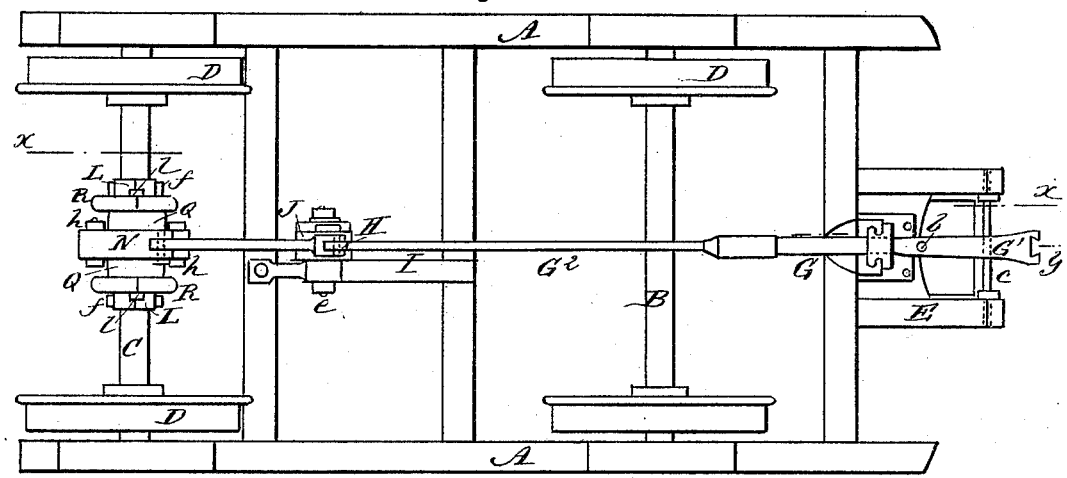
Figure 2:
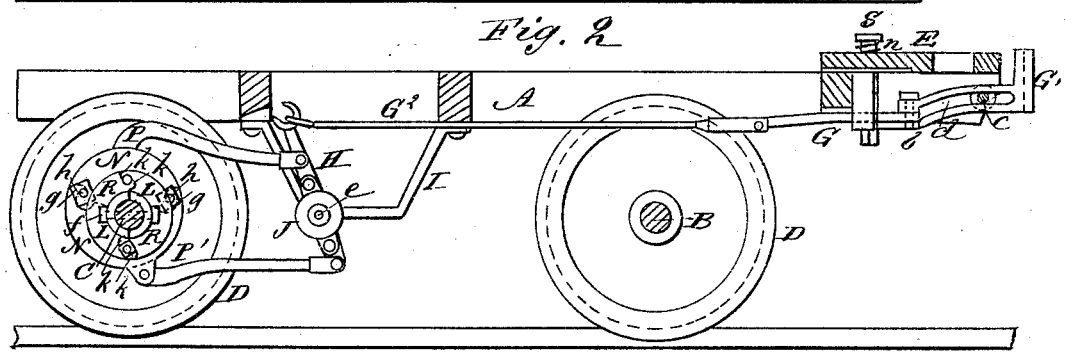
Figure 3:
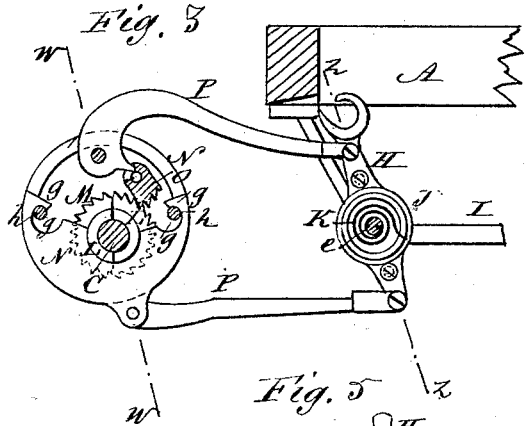
Figure 4:
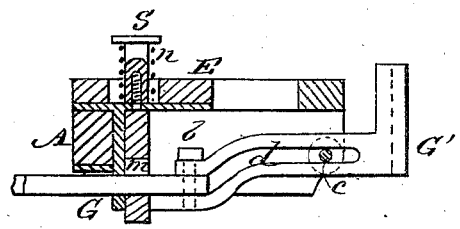
Figure 5:
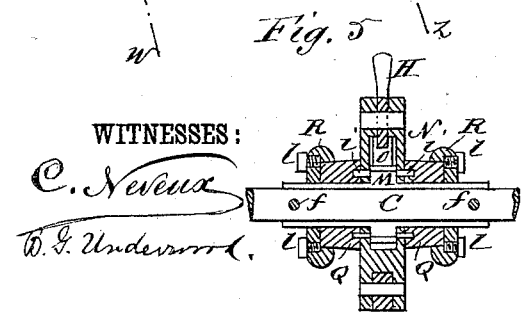
Figure 6:
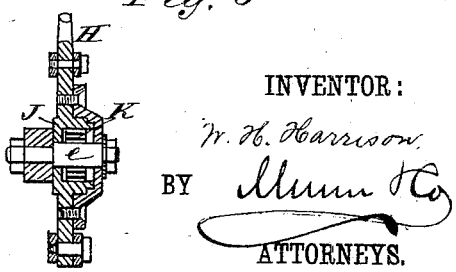

Figure 1 represents an inverted plan of the truck portion of a railroad street-car with my invention applied; Fig. 2, a longitudinal vertical section of the same on the irregular line *x x* in Fig. 1. Fig. 3 is a transverse section through the rear axle of the car to which the starter is applied, and showing a clutch which engages with a wheel on said axle as partly uncovered, and the devices which are immediately connected with said clutch for the purpose of operating it. Fig. 4 is a longitudinal vertical section, in part on the line *y* in Fig. 1; and Figs. 5 and 6, sections taken respectively through the lines *w w* and *z z* in Fig. 3.

In the drawings, which are designed to represent my improved car-starter as applied to what is termed a "one-ended" car, and to the rear axle thereof, A indicates the frame-work of the truck portion of the car; B, its front and C its rear axle, and D D the running-wheels arranged upon said axles.

E indicates the front-end platform of the car or frame supporting the same.

G indicates a sliding draw-bar, through which the draft is communicated to the vehicle and power conveyed to the starter; and G', a horizontal swinging draw-head, pivoted at *b* to the forward end of the draw-bar, and supported in advance of its pivot by a cross-bar, *c*, arranged to pass through a slot, *d*, in said draw-head. This construction and mode of attaching and supporting the draw-head provides for a steady hang of the same and free movement thereof by the team to either side without interfering with the starting devices.

$G^2$ is a connecting-rod attached to the rear end of the draw-bar G, and virtually forming a backward continuation of said bar. This rod is jointed or hooked at its rear end to the upper end of a double-armed lever, H, which has its fulcrum at *e* in the frame I, that carries the brake. Secured on said lever H, in concentric relation with its fulcrum *e*, about which the lever freely turns, is a spring box or case, J, that contains within it a coiled spring, K, one end of which is attached to the case J and the other end to the fixed fulcrum *e*. The spring K exerts a constant tendency on the lever H to draw the rod $G^2$ and draw-bar G back and controls the starter.

Instead of a boxed coil-spring, K, being used, a straight spiral spring, acting against suitable collars, may be arranged around the draw-bar or its connecting-rod $G^2$, to have the same effect; but by using the boxed coil-spring K greater compactness is effected, and the spring is readily protected from mud and dust, the box or case J having a cover on its outer face to shut in the spring.

Arranged around the rear axle, C, is a sleeve, L, split or divided longitudinally—that is, made in longitudinal sections or halves—and having a correspondingly-divided toothed or ratchet wheel, M, attached to or forming part of it intermediately of its length. This sleeve, with its attached wheel, is firmly secured to the axle by transverse bolts *f f*.

Arranged around the divided sleeve L, so as to be free to turn thereon, is a transversely-divided clutch box or case, N, the divided portions of which meet together near the periphery of the case by reverse hook-shaped parts *g g*, to receive within and through them bolts *h h*, that, being encircled by the reverse hooks *g g* on both sides of the axle, serve to hold the two transverse sections of the clutch-box firmly together. Said clutch box or case may be arranged eccentrically around the sleeve L, to provide more room for certain working details of the clutch, and one of its sections be made with a removable face-plate, or in halves transversely of the axis of the clutch, as shown in Fig. 3, to provide for the insertion and removal of said details. These details consist of a dog, O, pivoted to the case on its interior, and engaging with or disengaging from, as required, the toothed wheel M, and a hook-shaped bar, P, also pivoted to the case and engaging with the dog O, so as to turn it. This bar P and a correspondingly-pivoted bar, P', on the opposite side of the axle connect the clutch-case N at equal distances from the axle with the lever H on opposites sides of and at equal distances from the fulcrum $e$, but at points which present a reduced leverage as compared with the connection of the draw-bar or its rod $G^2$ with said lever, whereby the power of the draft is increased or multiplied on the starter. The clutch-case N has arranged on either side of it a transversely-divided hub, Q, in pin-connection, as shown at $i\ i$, with the case. The sections of each of the two divided hubs are hooked-shaped where divided, similar to the hooks $g\ g$ of the case, and secured together by screw-bolts fitting the hooked recesses in them. These hubs Q are bound on their outer ends by end inclosing-bands, R, which are also transversely divided and formed with hooks $k\ k$, that receive screw-bolts $l\ l$ within them, to hold the sections of the bands together. These hubs and bands serve to give an extended bearing to the clutch-case on the sleeve L and to stiffen the starter. Virtually they form part of the case N, which, being divided and secured as described, may readily be put on and taken off the axle of the car without disturbing the running-gear, thereby providing for the independent attachment of the starter.

When the draft is applied to the draw-head G' to start the car said draw-head is drawn outward against the tension of the spring K, and the lever H is operated so as to cause the clutch-case N to be turned by the rods P P', and the dog O, by its engagement with the wheel M, made to turn the axle C at or with the leverage gain of the starter. A similar action takes place to prevent a retrograde movement of the car when stopped on an upgrade. The spring K serves to return the parts to their normal position when the car is relieved from the draft or back pull, and to ease the drawing action of the car by preventing any jerking action of the draft on starting, to the benefit of the horses as well as the comfort of the passengers. The clutch is disengaged from the axle C when it is required to back the car, or whenever it is not desired to use the starter, by the driver pressing down with his foot on a spring sliding stop, S. This stop has a slot, $m$, in it, and when pressed down against the tension of its spring $n$ said stop is brought into position to allow of the inner end of the draw-head G' passing into or through said slot. This increased backward movement of the draw-head and movements of its connections with the clutch, relieve the dog O from engagement with the ratchet-wheel M, and so disconnect the starter. When the stop S is not thus depressed it stops or arrests the backward motion of the draw-head at a point which keeps the starter in engagement with the axle, ready for starting the car when pulling outward on the draw-head.

The term "clutch," as here applied, comprises the loose clutch-case, the wheel fast on the axle for engagement with the clutch-case, and means for engaging said clutch-case with said wheel.

Having thus fully described my invention, what I claim as new, and desire to secure by Letters Patent, is—

1. The combination, with the car-axle, of a clutch having its case fitted to turn on the axle and arranged to engage therewith, a longitudinally-sliding draw-bar, the lever H, controlled by the draw-bar and a spring combined, and the rods P P' for operating the clutch, substantially as specified.

2. The divided clutch-case N, having hooks $g\ g$, and the bolts $h\ h$, arranged to pass through or within said hooks for holding the sections of the case together, substantially as specified.

3. The combination, with the car-axle, of the longitudinally-divided clutch-case N, and the divided hubs Q Q, connected to the case N by pins $i$ and bands R R, said hubs and bands being connected together by hooks and screw-bolts, essentially as and for the purposes herein described.

4. The dog O, in combination with the loose clutch-case N, the toothed wheel M, and the rods P P' for operating the clutch, essentially as specified.

5. The clutch-case, operating-lever H, provided with a spring-holding box or case, J, in combination with the fixed fulcrum-pin $e$ and the spring K, essentially as shown and described.

6. The slotted draw-head G', in combination with its supporting-rod $c$ and the draw-bar G, to which said head is pivoted, to admit of its swing laterally and of sliding longitudinally in concert with said bar, substantially as described.

WILLIAM H. HARRISON.

Witnesses:
S. B. RANKIN,
W. S. SCHULTZE.